United States Patent
Tsujimoto et al.

(10) Patent No.: US 7,377,539 B2
(45) Date of Patent: May 27, 2008

(54) AIRBAG UNIT AND CASE OF AIRBAG UNIT

(75) Inventors: Kei Tsujimoto, Hikone (JP); Yoshitaka Matsui, Kanzaki-gun (JP); Wataru Nakazawa, Higashioumi (JP)

(73) Assignee: Takata Corporation, Tokyo (JP)

( * ) Notice: Subject to any disclaimer, the term of this patent is extended or adjusted under 35 U.S.C. 154(b) by 411 days.

(21) Appl. No.: 11/180,613

(22) Filed: Jul. 14, 2005

(65) Prior Publication Data

US 2006/0022435 A1 Feb. 2, 2006

(30) Foreign Application Priority Data

Jul. 30, 2004 (JP) ............................. 2004-223930

(51) Int. Cl.
*B60R 21/16* (2006.01)
(52) U.S. Cl. .................................... 280/728.2; 280/732
(58) Field of Classification Search ............. 280/728.2, 280/732, 741
See application file for complete search history.

(56) References Cited

U.S. PATENT DOCUMENTS

| | | | | |
|---|---|---|---|---|
| 5,295,707 A | * | 3/1994 | Satoh et al. ............. | 280/728.2 |
| 5,374,078 A | | 12/1994 | Amamori et al. | |
| 5,405,163 A | | 4/1995 | Amamori et al. | |
| 5,431,439 A | * | 7/1995 | Amamori et al. ........... | 280/732 |
| 5,613,699 A | * | 3/1997 | Schambre ................ | 280/728.2 |
| 6,161,862 A | * | 12/2000 | Rose et al. .............. | 280/728.2 |
| 6,325,415 B1 | * | 12/2001 | Zelinski et al. .......... | 280/743.2 |
| 6,336,661 B1 | | 1/2002 | Amamori | |
| 6,840,536 B2 | * | 1/2005 | Ahn et al. ................ | 280/728.2 |
| 7,097,196 B2 | * | 8/2006 | Chavez et al. ........... | 280/728.2 |
| 2002/0050701 A1 | * | 5/2002 | Amamori ................. | 280/728.2 |

FOREIGN PATENT DOCUMENTS

| | | |
|---|---|---|
| EP | 1 203 703 A2 | 5/2002 |
| JP | 02155855 | 6/1990 |
| JP | 06293244 | 10/1994 |
| JP | 06293245 | 10/1994 |
| JP | 06298032 | 10/1994 |
| JP | 08225049 | 9/1996 |
| JP | 09076862 | 3/1997 |
| JP | 09226496 | 9/1997 |
| JP | 09315249 | 9/1997 |
| JP | 10100830 | 4/1998 |
| JP | 11034778 | 2/1999 |
| JP | 11042994 | 2/1999 |
| JP | H11-042994 | 2/1999 |
| JP | 11189120 | 7/1999 |
| JP | 2001270408 | 10/2001 |
| JP | 2001270412 | 10/2001 |
| JP | 2003040064 | 2/2003 |

* cited by examiner

*Primary Examiner*—Eric Culbreth
*Assistant Examiner*—Nicole Verley
(74) *Attorney, Agent, or Firm*—Manabu Kanesaka

(57) ABSTRACT

A case of an airbag unit includes a case body for forming a storage room for accommodating an airbag, and a movable component attached to the case body for forming at least a part of an edge of an opening of the case body. The movable component has a lower end portion bent in a direction away from the case body. The movable component is movable toward the bottom when an external force is applied to the case.

9 Claims, 6 Drawing Sheets

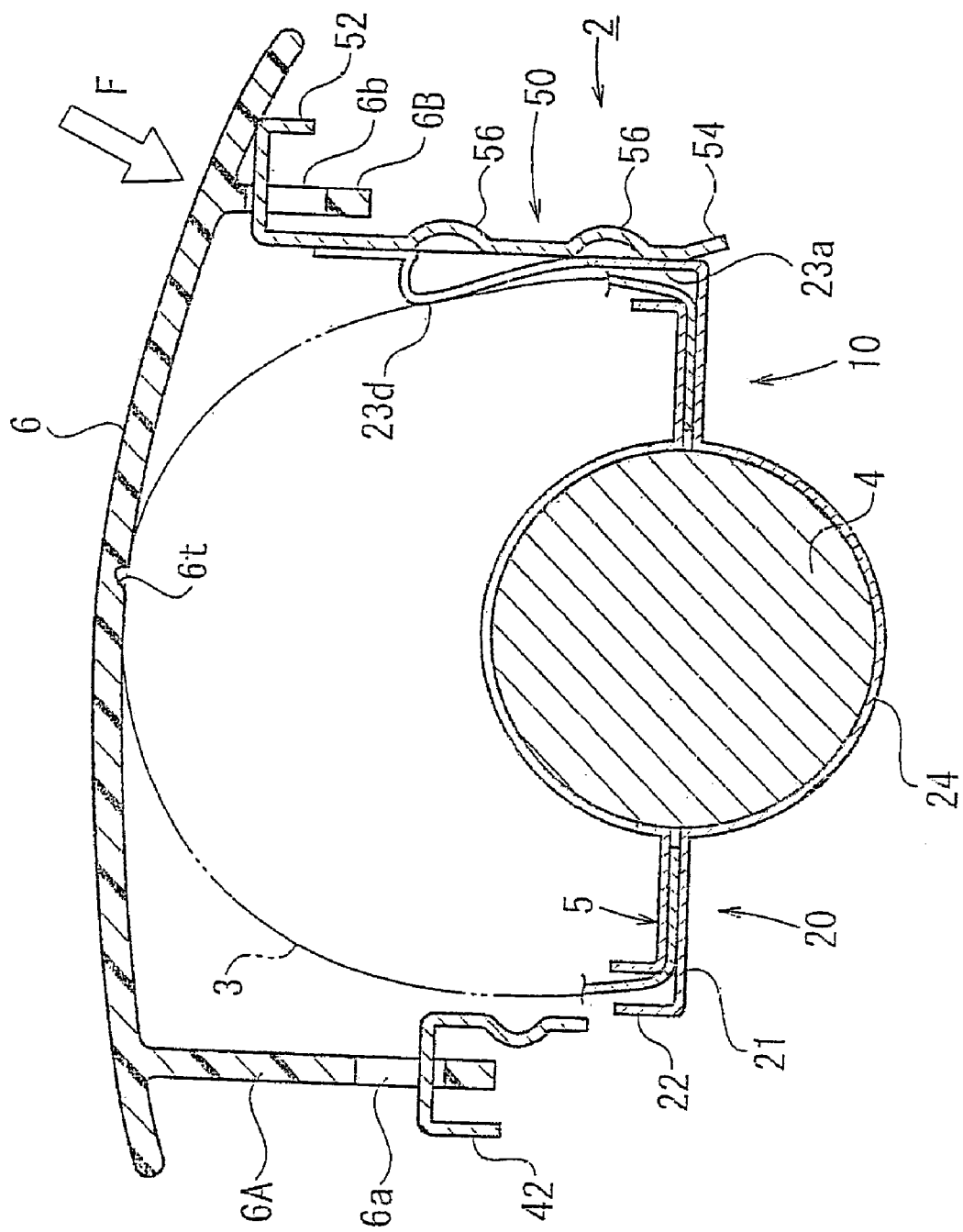

1

AIRBAG UNIT AND CASE OF AIRBAG UNIT

BACKGROUND OF THE INVENTION AND RELATED ART STATEMENT

The present invention relates to an airbag unit used for protecting a passenger in a vehicle, and a case for accommodating an airbag of the airbag unit. In particular, the present invention relates to a case capable of deforming in response to an external force to absorb an impact, and an airbag unit including the case.

An airbag unit for protecting a passenger is installed in an instrument panel of a vehicle, and includes a case, an airbag accommodated in the case, an inflator for expanding the airbag, and the like. Japanese Patent Publication (Kokai) No. 11-42994 has disclosed a structure having a retractable sliding member fastened with rivets or bolts on a sidewall of a case. When an object hits on an instrument panel, the sliding member retracts by sliding along the sidewall of the case.

Patent Document 1: Japanese Patent Publication (Kokai) No. 11-42994

In the airbag unit disclosed in Japanese Patent Publication (Kokai) No. 11-42994, when the sliding member retracts, an end portion thereof is pushed into the sidewall of the case, thereby causing strong resistance.

In view of the problem described above, an object of the present invention is to provide a case of an airbag unit including a movable component that can always retract smoothly when an external force is applied.

Another object of the present invention is to provide an airbag unit including the case.

Further objects and advantages of the invention will be apparent from the following description of the invention.

SUMMARY OF THE INVENTION

In order to achieve the above objects, according to a first aspect of the present invention, a case includes a storage room for accommodating an airbag and an opening facing a vehicle cabin. The case includes a case body functioning as a base end disposed opposite to the opening, and a movable component being at least part of an end portion of the opening and retractable toward the base end along the case body in response to an external force applied to the case. An end portion of the movable component adjacent to the base end is deformed so as to be away from the case body.

According to a second aspect, in the case in the first aspect, at least part of the end portion of the movable component adjacent to the base end is located adjacent to the vehicle cabin, and is away from an edge of the case body adjacent to the opening before the movable component retracts.

According to a third aspect, in the case in one of the first and second aspects, the movable component is disposed so as to retract along an outer surface of the case body, and the end portion of the movable component adjacent to the base end is deformed outwardly from the case.

According to a fourth aspect, an airbag unit includes the case in one of the first to third aspects, an airbag accommodated in the case, and an inflator for expanding the airbag.

In the case and the airbag unit including the case in the present invention, the end portion of the movable component adjacent to the base end is deformed (for example, bent) so as to be away from the case body. Accordingly, during the retraction of the movable component in response to the external force generated when an object hits on the instrument panel, the rear end portion of the movable component is not subjected to strong resistance from the case body, so that the movable component retracts smoothly.

In the present invention, it is preferable that at least part of the end portion of the movable component adjacent to the base end is located adjacent to the vehicle cabin and is remote from the case body. With this structure, even when the end portion of the movable component adjacent to the base end contacts the edge of the case body, the movable component can be smoothly guided to the side surface of the case body by the deformed rear end portion, and can smoothly retract along the case body.

In the present invention, it is preferable that the movable component is disposed so as to retract along the outer surface of the case body, and the end portion of the movable component adjacent to the base end is deformed outwardly from the case. Accordingly, the movable component and the deformed end portion adjacent to the base end smoothly retract without interfering with the airbag in the case.

BRIEF DESCRIPTION OF THE DRAWINGS

FIG. 6 is a longitudinal sectional view of the airbag unit when an object hits the airbag unit.

DETAILED DESCRIPTION OF PREFERRED EMBODIMENTS

Figure 5:
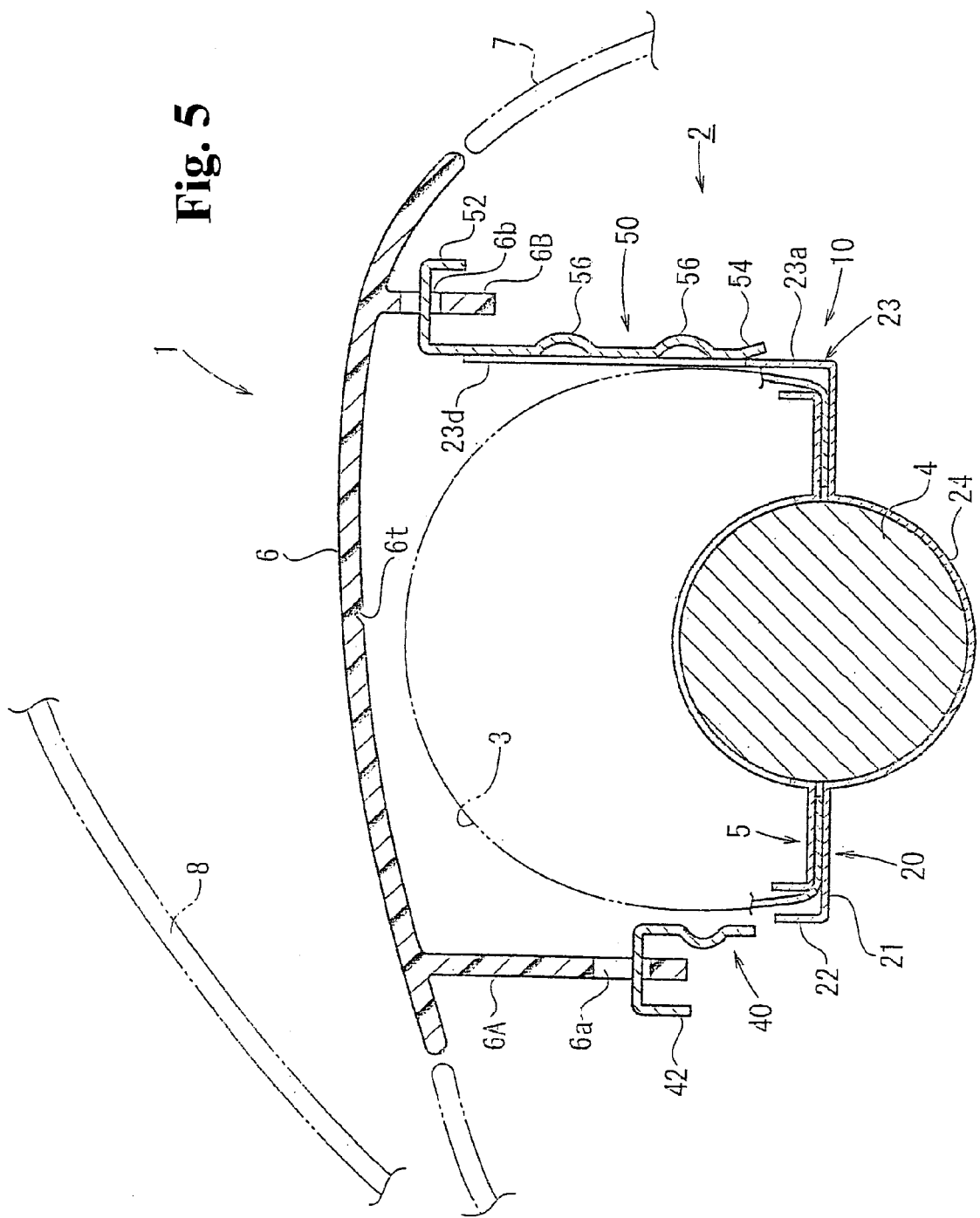
FIG. 5 is a longitudinal sectional view of the airbag unit.

In the embodiment, the airbag unit is disposed in an instrument panel such that the case has an opening substantially at the top as shown in FIG. 5. Accordingly, an upper side of the figures adjacent to a vehicle cabin corresponds to an upper side of the airbag unit, whereas a lower side of the figures corresponds to a lower side of the airbag unit.

Figure 3:
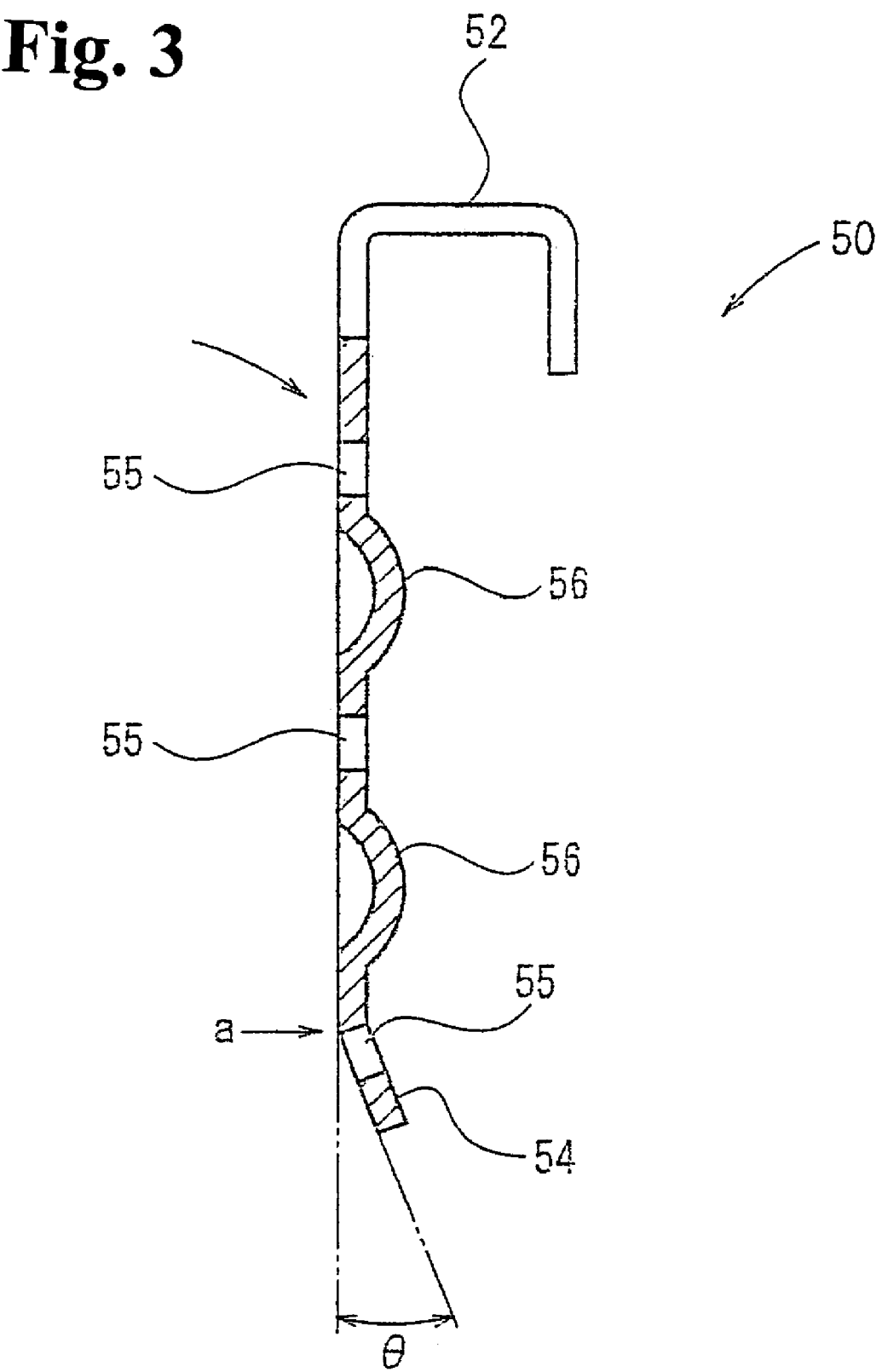
FIG. 3 is a cross-sectional view taken along line 3-3 in FIG. 2.
Figure 4:
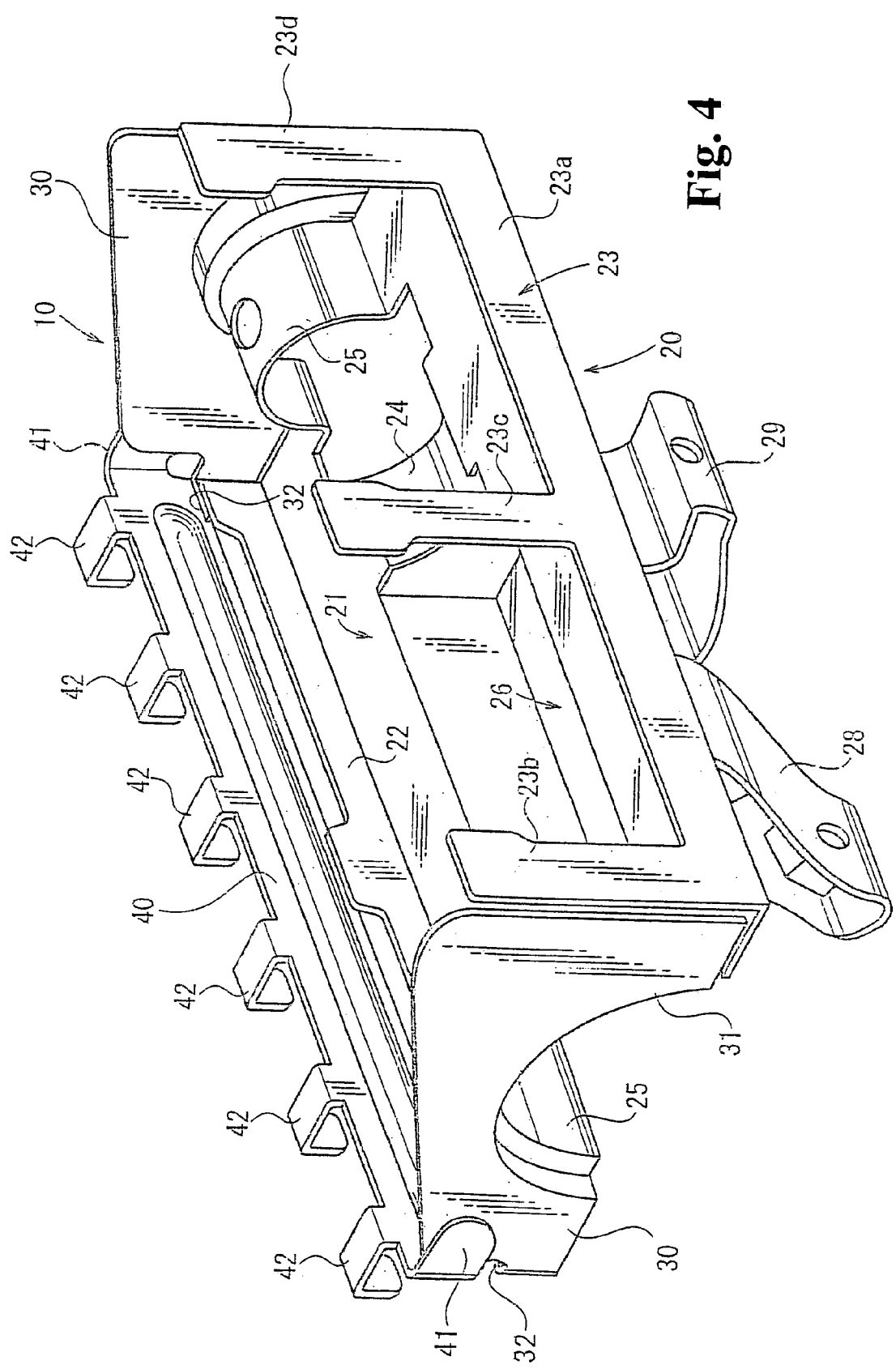
FIG. 4 is a perspective view of a case body.

As shown in FIG. 5, an airbag unit 1 includes a case 2, a folded airbag 3 accommodated in the case 2, an inflator 4 for expanding the airbag 3, an attachment frame 5 for attaching the airbag 3 and the inflator 4 to the case 2, and a lid 6 covering the case 2. The case 2 includes a case body 10 and a movable component 50 attached to the case body 10 shown in FIGS. 2 and 3. As shown in FIGS. 4 and 5, the case body 10 includes a base 20 having side plates 30 disposed at the left and right sides and a hook plate 40.

The base 20 includes a bottom section 21, a wall 22 extending upwardly from a long side of the bottom section 21, a comb-shaped wall 23 extending upwardly from the other long side of the bottom section 21, semicircular concaved portions 24 and semicircular convexed portions 25 in the bottom section 21, and a concaved portion 26 hollowed around the center of the bottom section 21. Brackets 28 and 29 for attaching the airbag unit to a vehicle are fixed to the lower surface of the base 20 by welding.

The airbag unit 1 is mounted in a vehicle such that the wall 22 is adjacent to the front side of the vehicle and the comb-shaped wall 23 is adjacent to the backside of the vehicle. The comb-shaped wall 23 includes a lower portion 23a extending along the bottom section 21, pillars 23b and 23d extending upwardly from both sides of the lower portion 23a in the longitudinal direction, and a pillar 23c extending upwardly at the intermediate position between the pillars 23b and 23d. The number and the positions of the pillars are not limited to those described above. The semicircular portions 24 and 25 have a substantially same radius and are disposed coaxially. The inflator 4 is cylindrical, and is disposed such that end portions thereof are fitted into spaces between the semicircular portions 24 and 25.

As shown in FIG. 5, an end portion of a gas inlet of the airbag 3 and the inflator 4 are held between the attachment frame 5 and the base 20. The attachment frame 5 is fixed to the base 20 with bolts or rivets (not shown). The side plates 30 are sidewalls disposed at the left and the right sides of the case body 10. The left and the right sides correspond to the left and the right sides of the vehicle when the airbag unit is put in the instrument panel.

A semicircular cut-off portion 31 having a radius slightly larger than that of the semicircular portions 25 of the base 20 is provided at the lower end of each side plate 30. An anchoring piece 32 extending from one side of each side plate 30 is bent. The anchoring pieces 32 are overlapped on the outer surface of the wall 22 of the base 20 and fixed to the wall 22 by spot welding such that the side plates 30 are fixed to the base 20. No anchoring piece is formed at the other side of each side plate 30, and the other side of each side plate 30 is not directly linked to the comb-shaped wall 23 (free). The side plates 30 are located outside the bottom section 21 of the base 20.

As described above, the side plates 30 are linked to the base 20 only through the anchoring pieces 32 fixed to the wall 22, and are not directly linked to the comb-shaped wall 23. Moreover, the side plates 30 are located outside the bottom section 21. Therefore, when a downwardly external force is applied to the side plates 30, the side plates 30 are deformed around the anchoring pieces 32 such that portions adjacent to the combshaped wall 23 are pressed downwardly.

The hook plate 40 extends along the wall 22 above the wall 22. Anchoring pieces 41 are bent and extend from both ends of the hook plate 40 in the longitudinal direction. The anchoring pieces 41 are fixed to the side plates 30 by spot welding such that the hook plate 40 is fixed to the side plates 30. A plurality of hooks 42 protrudes from the upper end of the hook plate 40 in the longitudinal direction with a predetermined spacing therebetween. The hooks 42 extend slightly upwardly from the hook plate 40, then bend outwardly from the case body 10, and subsequently bend downwardly.

Figure 1:
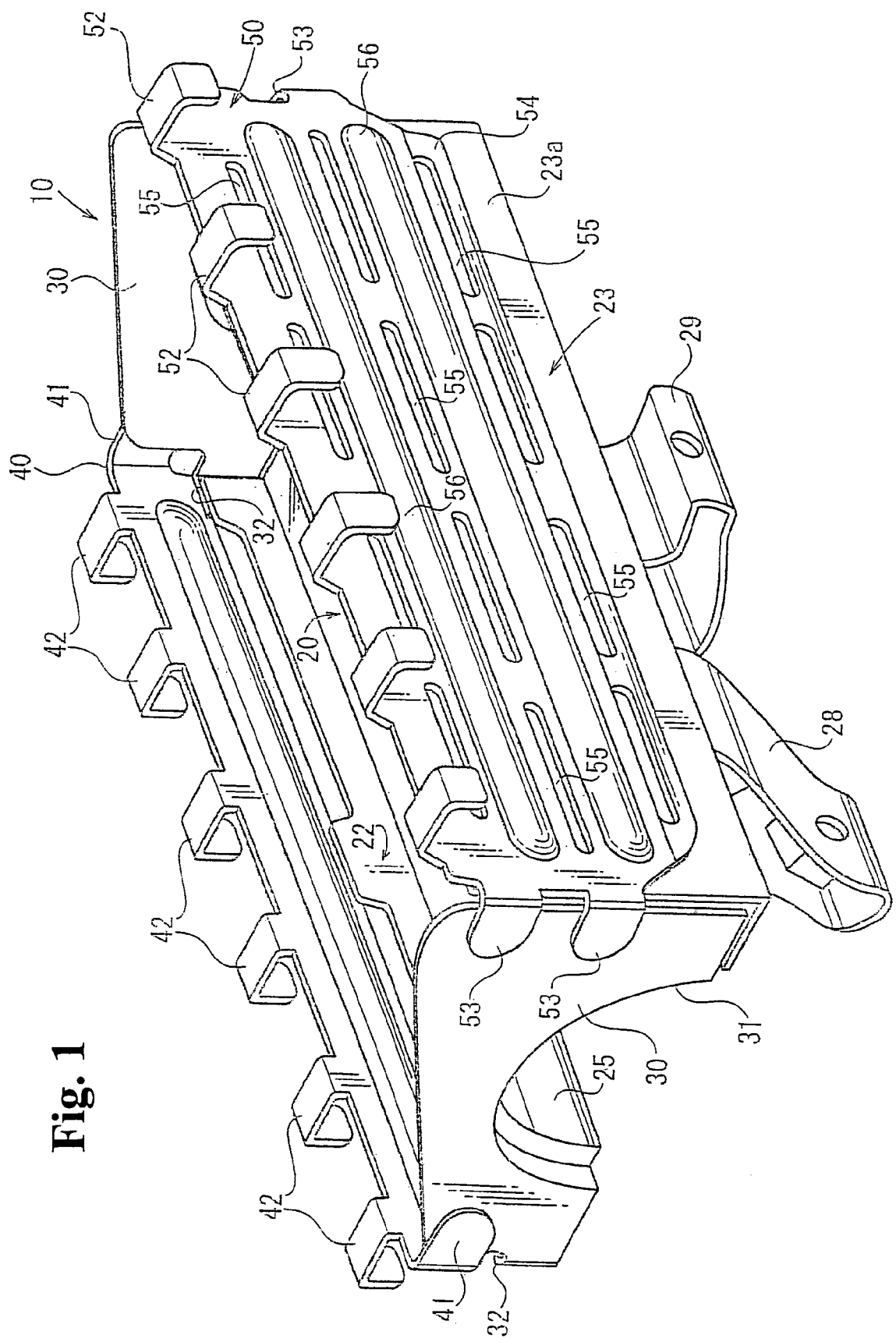
FIG. 1 is a perspective view of a case of an airbag unit according to an embodiment of the present invention.
Figure 2:
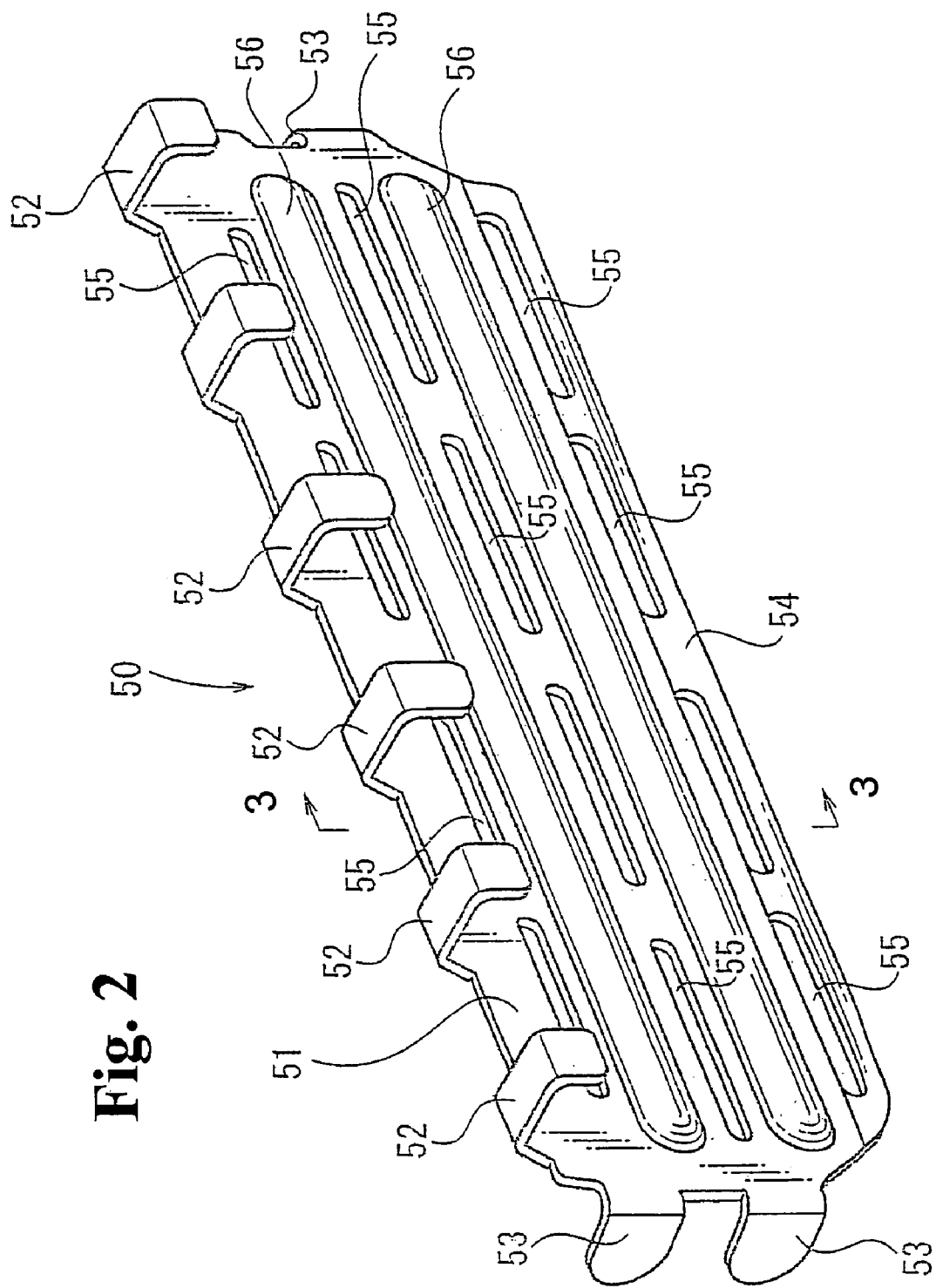
FIG. 2 is a perspective view of a movable component of the case.

As shown in FIG. 2, the movable component 50 includes an approximately rectangular main plate 51; a plurality of hooks 52 protruding from the upper end of the main plate 51; nail-shaped anchoring pieces 53 bent from the left and the right sides of the main plate 51 at a substantially right angle; a deformed section 54 formed at the lower portion of the main plate 51; and slits 55 and ribs 56 formed in the main plate 51. The slits 55 and the ribs 56 extend parallel to the long sides of the main plate 51. The shapes of the slits and ribs are not limited to those described above. The hooks 52 have a profile similar to that of the hooks 42, and are disposed on the upper end of the main plate 51 in the longitudinal direction with a spacing therebetween.

In the embodiment, two anchoring pieces 53 are disposed at each side of the main plate 51. The number is not limited to two. The deformed section 54 is formed by bending a lower end portion of the main plate 51 such that the lower end portion is away from the comb-shaped wall 23. The lower end portion of the main plate 51 is bent by an angle θ along a bending line a (see FIG. 3) parallel to the lower side of the main plate 51 so as to form the deformed section 54. The angle θ is preferably 90 degrees or less. The deformed section 54 may be formed by curving the lower end portion of the main plate 51.

The movable component 50 is disposed along the outer surface of the comb-shaped wall 23 of the base 20, and the anchoring pieces 53 are disposed along the outer surfaces of the side plates 30. The anchoring pieces 53 are fixed to the side plates 30 by spot welding. In addition, the main plate 51 is fixed to upper portions of the pillars 23b, 23c, and 23d of the comb-shaped wall 23 by spot welding.

As shown in FIG. 5, the lid 6 is attached to the case 2 so as to cover the folded airbag 3 accommodated in the case 2. A leg 6A adjacent to the front side of the vehicle and a leg 6B adjacent to the backside of the vehicle protrude from the back side of the lid 6, and the hooks 42 and 52 are caught in holes 6a and 6b formed in the legs 6A and 6B, respectively. The lid 6 includes a tear line 6t to be torn when the airbag 3 is inflated by the inflator 4.

The airbag unit 1 having the above-described structure is installed such that the lid 6 is flush with an instrument panel 7, and the brackets 28 and 29 are fixed to vehicle members (not shown) by bolts and the like. When an object hits and an external force is applied to the lid 6 of the airbag unit 1 in the vicinity of the movable component 50 as indicated by an arrow F shown in FIG. 6, the movable component 50 is pushed by the external force and retracts (moves downwardly in the embodiment). At this time, the pillars 23b, 23c, and 23d of the comb-shaped wall 23 are deformed so as to be buckled. Moreover, the side plates 30 are deformed around the bases of the anchoring pieces 32 such that the portions adjacent to the comb-shaped wall 23 are pressed downwardly.

Even though the movable component 50 moves downwardly, the lower portion 23a of the comb-shaped wall 23 does not move downwardly due to the firm support of the bottom section 21. As a result, the movable component 50 moves downwardly while sliding on the outer surface of the lower portion 23a.

The deformed section 54 is formed in the lower end portion of the movable component 50 such that the deformed section 54 is away from the comb-shaped wall 23. Accordingly, the movable component 50 is not caught in the upper end of the lower portion 23a, and can smoothly move downwardly. As a result, the pillars 23b to 23d and the side plates 30 can be smoothly deformed, and an impact occurring when the object hits against the lid in the vicinity of the movable component 50 or on the instrument panel can be sufficiently absorbed.

The above-described embodiment is an example of the present invention, and embodiments other than that shown in the drawings are possible. For example, the comb-shaped wall 23 may be a relatively thin wall component.

The disclosure of Japanese Patent Application No. 2004-223930, filed on Jul. 30, 2004, is incorporated in the application.

While the invention has been explained with reference to the specific embodiments of the invention, the explanation is illustrative and the invention is limited only by the appended claims.

What is claimed is:

1. A case of an airbag unit, comprising:
   a case body for forming a storage room for accommodating an airbag, said case body having a bottom, and an opening opposite to the bottom, and a movable component forming at least a part of an edge of the opening and substantially entirely covering one side portion of the case body, said movable component having a lower end portion bent in a direction away from the case body and being attached to the case body only at an upper part thereof so that said movable component is moved toward the bottom while deforming a part of the case body attached thereto when an external force is applied to the case.

2. A case of an airbag unit according to claim 1, wherein said movable component includes an upper end portion for forming at least the part of the edge of the opening, said lower end portion being located at a compartment side of the case body before the movable component moves toward the bottom.

3. A case of an airbag unit according to claim 1, wherein said movable component is disposed so as to move downwardly along an outer surface of the case body.

4. An airbag unit comprising the case according to claim 1, an airbag accommodated in the case, and an inflator for expanding the airbag.

5. A case of an airbag unit according to claim 1, wherein said case body further includes two side plates connected to a side of the case body opposite to the moveable component without touching the bottom, said movable component being fixed to the side plates.

6. A case of an airbag unit according to claim 5, wherein said case body further includes a plurality of pillars extending upwardly from the bottom, said movable component being located outside the pillars.

7. A case of an airbag unit according to claim 1, wherein said movable component includes a plurality of slits extending parallel to the bottom and spaced vertically away from each other, and ribs curved outwardly of the case body and situated between two of the slits.

8. A case of an airbag unit, comprising:
  a case body for forming a storage room for accommodating an airbag, said case body having a bottom and an opening opposite to the bottom, and
  a movable component attached to the case body for forming at least a part of an edge of the opening, and having a lower end portion bent in a direction away from the case body, said movable component being movable toward the bottom when an external force is applied to the case,
  wherein said case body includes a lower portion extending upwardly from the bottom and a plurality of pillars extending upwardly from the lower portion, and said movable component includes a main plate fixed to the plurality of pillars so that the lower end portion is located over the lower portion of the case body.

9. A case of an airbag unit according to claim 8, wherein said movable component further includes hooks extending outwardly from an upper portion of the main plate.

* * * * *